Figure 2:
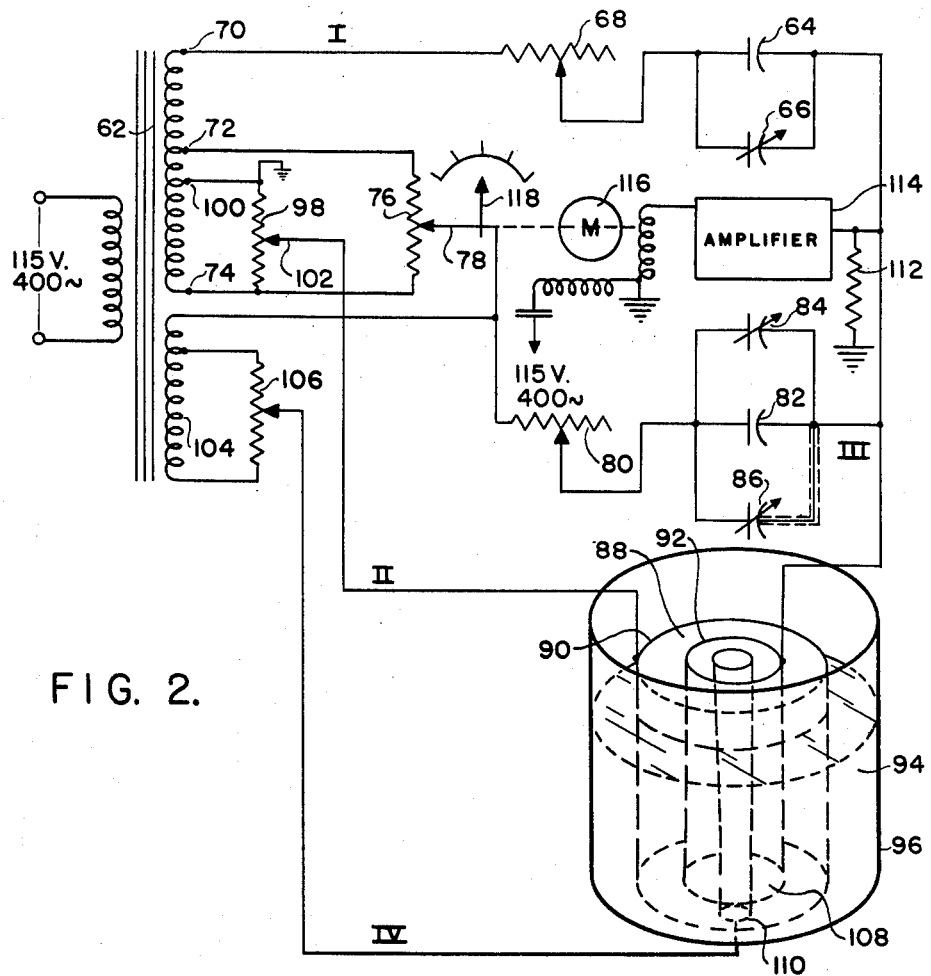

Dec. 30, 1958   M. J. MINNEMAN ET AL   2,866,337
COMPENSATED LIQUID QUANTITY MEASURING APPARATUS
Filed Aug. 31, 1954

INVENTORS.
MILTON J. MINNEMAN
PAUL MARCUS
By Leonard H. King.
AGENT

United States Patent Office 2,866,337
Patented Dec. 30, 1958

2,866,337

COMPENSATED LIQUID QUANTITY
MEASURING APPARATUS

Milton J. Minneman, Kew Garden Hills, and Paul Marcus, Holliswood, N. Y., assignors to Avien, Inc., Woodside, N. Y.

Application August 31, 1954, Serial No. 453,396

7 Claims. (Cl. 73—304)

This invention relates to capacitive type measuring apparatus and in particular to such apparatus suitable for measuring of liquid quantity.

A typical application for this apparatus is the measurement of the quantity of fuel present in fuel tanks of aircraft.

Modern aircraft, particularly jet types, can operate efficiently with a variety of fuels. In practice, these fuels have dielectric constants that differ widely, resulting in substantial errors in measurement when measured by means of conventional capacitive type measuring apparatus.

The pilot of an aircraft is concerned with the total energy available in the form of fuel in the aircraft's tank rather than specifically the total number of gallons. Since the power to be derived from a fuel is based on its available energy, which is in turn based upon weight rather than volume, it is preferred that where the system is used as a fuel gage, the indicator be calibrated in terms of pounds rather than gallons. The system described in this application determines the weight of fuel by sensing its level and applying correction factors based upon a measurement of its dielectric constant.

Recent studies have shown that different samples of the same fuel type and density may have slightly different dielectric constants due to differences in chemical structure while different samples of even the same fuel type and dielectric constant may have different densities. A capacitance type liquid level measuring device may be set to indicate very accurately, gravimetrically, for any one sample of a particular fuel at a given temperature. However, for general use wherein many different samples, even if of the same general type of fuel, are measured over a wide range of temperatures, appreciable errors can result particularly since many materials show a different ratio of change in dielectric constant with change in density. Accordingly, a practical fuel gaging system requires the ability to correct or adjust automatically for the different characteristics of a variety of different types of fuel and for changes in fuel characteristics due to temperature change.

With the increase in size of modern aircraft the wiring "runs" between sensing capacitors and associated electronic circuits have become exceedingly long; wire lengths of a hundred feet are not unusual. Therefore a need exists for improved measuring circuits which are insensitive to the phase shifts and interference from other wiring aboard an aircraft which effects are apt to be more pronounced in equipment utilizing such long wiring runs.

An object of this invention is to provide a circuit for a capacitive type gravimetric measuring apparatus which automatically compensates for the dielectric constant of a liquid being measured.

A further object of this invention is to provide an improved circuit for a capacitive type gravimetric measuring apparatus which is self-compensating for changes in the capacitive index of the liquid being measured.

A particular object of this invention is the provision of an improved compensated capacitive type measuring apparatus for the measurement of liquid quantity.

It is another object of this invention to provide a capacitance measuring circuit which may be adjusted at both ends of its operating range to provide a low null voltage at balance.

An object of this invention is to provide a circuit insensitive to effects of long interconnecting conductors.

A further object of this invention is to provide a circuit readily adjusted to measure a wide range of capacitances.

For a more complete understanding of the present invention reference should be had to the following detailed description taken in conjunction with the accompanying drawings which disclose the best mode now contemplated by us for practicing the invention.

Figure 1:
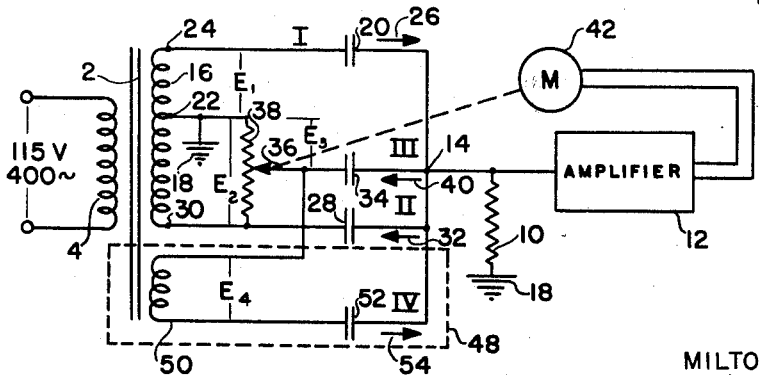

In Figure 1 there is shown a simplified circuit diagram of the apparatus.

In Figure 2 there is shown partly pictorially and partly schematically a practical embodiment of the apparatus of this invention.

Briefly stated, the apparatus includes a self-balancing bridge circuit such as is shown in Figure 1. The circuit is energized by means of a transformer shown generally at 2 which is provided with a primary winding 4 to which is applied 115 volt 400 cycle A. C. power. The operation of the circuit may be easily followed if it is considered in terms of the current in each branch. At a given instant, the currents in the various branches are in a particular phase relationship. This phase relationship is an important feature of this invention. The circuit is considered to be balanced when there is no output signal. That is to say, there is substantially no current flowing in a circuit common to all branches I, II, and III, shown. The circuit common to branches I, II, and III is the input to amplifier 12 which includes the grid resistor 10. This resistor 10 is connected, in effect, between junction 14 and transformer secondary winding 16 through ground 18.

Branch I includes a fixed reference capacitor 20 to which is applied voltage $E_1$ which appears across the secondary winding 16 between taps 22 and 24. For purposes of explanation it may be assumed that at a given instant the polarity of the voltage $E_1$ is such that the current is traveling left to right in branch I as shown by arrow 26.

Forming part of branch II of the circuit is shown sensing capacitor 28 which is adapted to change in capacitance in accordance with the condition to be sensed for reasons given hereinafter. A voltage $E_2$ is applied to sensing capacitor 28 and is derived from the portion of secondary winding 16 connected between points 22 which is at ground potential and tap 30. Accordingly, the polarity of the applied voltage $E_2$ is opposite to that polarity present at a given instant at point 24. Therefore, the current flowing in branch II, shown by arrow 32, is opposite in phase to the current flowing in branch I.

Branch III comprises a fixed capacitor 34 to which is applied a variable source of voltage $E_3$. The voltage is derived from variable arm 36 of potentiometer 38.

Since potentiometer 38 is connected between taps 22 and 30, voltage $E_3$ is in phase with voltage $E_2$ and therefore, as shown by arrow 40, the currents in branches II and III are in phase. The arm is actuated by motor 42 which is under the control of amplifier 12. The motor is operated whenever a signal voltage is applied to the amplifier which occurs whenever the bridge is unbalanced. The motor drives in such a direction as to restore balance. Under conditions of balance the sum of the currents from branches I, II, and III are substantially equal to zero and therefore the motor is inoperative, so that the bridge is self-balancing.

In summary:

Branch I comprises a fixed voltage source $E_1$ and a fixed capacitance 20;

Branch II comprises a fixed voltage source $E_2$ and a variable capacitance 28; and Branch III comprises a variable voltage source $E_3$ and a fixed capacitance 34.

The phase of the current in branch I is 180° out of phase with that of brances II and III in the common circuit (the grid resistor 10), while the currents of branches II and III are in phase. The sensing capacitor 28 is mounted so that it may be inserted in the liquid to be measured. Such a capacitor is described, for example, in the copending application of Franklin Meyer for Compensating Gravimetric Measuring Apparatus filed February 15, 1954, S. N. 410,289, and assigned to the assignee of the present invention. A change in level of the liquid results in a change in the capacitance of capacitor 28. The capacitance will change because the dielectric of the unimmersed or dry portion of capacitor 28 is air which has a dielectric constant of 1.0, while the dielectric of the immersed portion is the fuel, and the dielectric of a typical hydrocarbon fuel is in the vicinity of 2.0.

Accordingly, the capacitance of a sensing capacitor, fully immersed in fuel, would be twice as great as the capacitance of one immersed in an empty tank when the dielectric is air. A partly filled tank would result in an intermediate value of capacitance. The change in capacitance results in a change in current through the sensing capacitor and so unbalances the circuit.

The change in capacitance depends not only upon the level of the liquid but also upon its dielectric constant as has been pointed out, for example, in the referenced copending application of Franklin Meyer. Actually a very wide range of densities and, accordingly, a wide range of dielectric constants exists over the temperature range of −55° C. to +70° C. frequently encountered by aircraft.

In applications demanding extreme accuracy it is desirable to include a provision for compensating for variation in the dielectric constant of the liquid being measured. In the present circuit this is accomplished by utilizing a capacitive index compensating circuit 48. That is to say, a circuit for correcting the system which approximates the function $$\frac{K-1}{D}$$

for the range of liquids contemplated, wherein K is the dielectric constant and D the density of the liquids.

The circuit includes a floating winding 50. One end of the winding is connected to potentiometer arm 36. The other arm is connected through suitable conductors to a compensating capacitor 52, which utilizes as its dielectric the same liquid being sensed. This fourth branch of the bridge circuit is in parallel with branch III. The purpose of winding 50 is to provide a 180° phase shift in the voltage applied to capacitor 52 so as to produce a current 180° out of phase with the current in branch III, as shown by arrow 54. The voltage $E_4$ produced by winding 50 is such that when wiper 36 of potentiometer 38 is at the extreme position wherein the maximum voltage $E_3$ is applied to capacitor 34 then $E_4$ is equal to $E_3$, so as to produce, in effect, zero correction. Thus it may be seen that the effect of branch IV will be greatest when wiper arm 36 is at the grounded or low potential end of potentiometer 38 which corresponds to the condition for this measuring system wherein the tanks contain a maximum quantity of liquid.

Considering now, in detail, the practical embodiment of this invention disclosed in Fig. 2: Transformer 62 is energized by 115 volt 400 cycle current from the aircraft power supply (not shown). Branch I comprises fixed reference capacitor 64 and trimmer capacitor 66 in parallel with the reference capacitor.

In order to permit the use of an inexpensive reference capacitor 64, trimmer capacitor 66 is used in parallel with reference capacitor 64. This provides a means to factory adjust the circuit for bridge balance at full. If this trimmer were omitted, carefully selected reference capacitors would be necessary. In series with capacitor 64 there is provided rheostat 68, which is used for adjusting the phase relationship between branch I and the other branches of the circuit. Branch I is connected to tap 70 of transformer 62. Between taps 72 and 74 of transformer 62 there is connected potentiometer 76. To movable arm 78 of potentiometer 76 there is connected a phasing rheostat 80 and a reference capacitor 82 to form branch III of the circuit. Tap 72 is but slightly above ground potential.

Rheostat 80 provides a means to preadjust the circuit in the factory to correct for phase shift introduced by the connecting cables. This control provides a range of phase shifts adequate to match the requirements of the different installations which usually involve individual and quite different cable lengths. The phase shift results from the loading introduced by the equivalent capacitance of the cable which shunts the portion of potentiometer 98 in branch II.

In parallel with capacitor 82 there is provided variable capacitor 84 and variable capacitor 86. The function of capacitor 84 is to provide a means to adjust the bridge at the factory for balance at empty.

A calibrated test capacitor of representative value is employed in place of a sensing capacitor so that a circuit variable is eliminated. This permits a simplified testing and calibration procedure. Capacitor 86 is an adjustment intended for use in the field to critically adjust the system at empty for the particular sensing capacitors used in the installation.

Branch II of the circuit consists of sensing capacitor 88 which is comprised of electrodes 90 and 92. The sensing capacitor is shown immersed in liquid 94 which is confined in tank 96.

In a typical installation different depth tanks will utilize correspondingly differing sensing capacitor. In order to adapt the apparatus to these different capacitors having a wide range of capacitance values, a voltage divider 98 is connected across a portion of secondary of transformer 62 between taps 74 and 100. Movable arm 102 of potentiometer 98 provides means for adjusting the voltage applied to sensing capacitor 88. Normally this is a factory adjustment made upon assembly of the instrument.

In practice, for a production run, it is more economical to employ two properly selected fixed resistors in place of the potentiometer 98, the connection to branch II being made to the junction of the fixed resistors. Branch IV of the circuit comprises a floating winding 104 across a portion of which is provided potentiometer 106. The function of potentiometer 106 is to provide a means to adjust the device upon assembly so that the proper voltage is applied to compensating capacitor 108. The compensating capacitor consists of electrode 110 and electrode 92, the latter being shared in common with sensing capacitor 88. It is common practice to design an installation so that the compensating capacitor is normally covered. It will be noted that, as shown in Fig. 2, as the level of the liquid changes, both the capacitance of the sensing capacitor 88 and of compensating capacitor 108, will vary.

It is preferred that the running capacitance of the sensing capacitor be varied in a non-linear manner with respect to depth so that the system response is linear despite uncovering of the compensating capacitor.

This method of correcting for this variation in capacitance of the compensating capacitor with variation in liquid level is disclosed in the copending application of Leo A. Weiss, Serial Number 385,487, entitled, "Capacitive Liquid Measuring Apparatus" filed approximately October 12, 1953, now Patent 2,789,435, and assigned to the assignee of the present invention.

The four branches, branches I, II, III, and IV are connected in common to grid resistor 112 which forms the input circuit of amplifier 114 which controls motor 116. Motor 116 is mechanically linked to movable arm 78 of potentiometer 76, and also to indicator 118.

At balance the sum of the branch I, II, III, and IV currents in the grid resistor 112 is substantially zero.

The compensation capacitor 108 may be replaced by a fixed capacitor of comparable capacitance for use in applications wherein compensation is not desired. It should be noted that the capacitance value of the compensating capacitor 108 or its substitute is substantially smaller than the value of the reference capacitor 82. Thus the primary circuit influence is exerted by branch III rather than branch IV.

While we have disclosed the best mode presently contemplated of carrying out the invention, be it understood that further modifications and changes may be made within the scope of the appended claims.

What is claimed is:

1. Measuring apparatus comprising, a first circuit including a fixed voltage source and a fixed capacitor; a second circuit including a second voltage source substantially 180° out of phase with said first voltage source and a variable capacitor unit adapted to be inserted into a liquid being measured so that the capacitance of the unit varies with the level of said liquid; a third circuit including a third source of variable voltage out of phase with said first voltage source, and a reference capacitor; a fourth circuit including a voltage source substantially in phase with said first voltage source and arranged to vary inversely with variation of said third voltage source, and a compensating capacitor having a dielectric constant substantially the same as the dielectric constant of the liquid under measurement; an amplifier common to said four circuits and connected to receive the outputs, respectively, thereof; means operable under the control of said amplifier for varying said third voltage source in a direction to reduce the voltage impressed on said amplifier until said amplifier is ineffective to cause operation of said means; and an indicator under control of said means.

2. Apparatus for measuring the quantity of a liquid comprising, a first circuit including a first fixed voltage source and a fixed capacitor; a second circuit including a second voltage source and a variable capacitor unit adapted to be inserted into said liquid being measured so that the capacitance of the unit varies with the level of said liquid; a third circuit including a variable source of voltage out of phase with said first voltage source, and a reference capacitor; a fourth circuit including a fourth voltage source substantially in phase with said first voltage source and said third voltage source in series, and a compensating capacitor having a dielectric constant substantially the same as the dielectric constant of the liquid under measurement; an amplifier common to said circuits and connected to receive the outputs, respectively, thereof, and means operable under the control of said amplifier for varying said third voltage source in a direction to reduce the voltage impressed on said amplifier until said amplifier is ineffective to cause operation of said means; and an indicator under control of said means.

3. A capacitive type liquid quantity measuring apparatus comprising in combination: an amplifier provided with an input circuit, a motor under control of said amplifier, a first circuit comprising a first fixed source of voltage, a variable resistor, a fixed capacitor and said input circuit in series connection, a second circuit comprising an adjustable source of voltage substantially 180° out of phase with said first circuit voltage source, a variable capacitor unit comprising a pair of electrodes adapted to be inserted into a container of liquid so that the capacitance of the unit varies with the level of said liquid and said input circuit in series connection, a third circuit comprising a variable source of voltage substantially in phase with said second circuit voltage source and under the control of said motor, a variable resistance, a fixed capacitor and said input circuit in series connection, a fourth circuit comprising said third circuit variable voltage source, a second fixed voltage source in phase with said first circuit voltage source, a voltage divider connected across said second fixed voltage source, a compensating capacitor having a dielectric constant substantially the same as the dielectric constant of liquid under measurement connected to said voltage divider, and said input circuit in series connection, and indicating means under control of said motor.

4. A capacitive type liquid quantity measuring apparatus comprising in combination: a variable capacitor unit comprising a pair of electrodes adapted to be inserted into a container of liquid so that the capacitance of the unit varies with the level of said liquid; first and second fixed capacitors; a compensating capacitor utilizing said liquid as a dielectric; a first voltage source, a first circuit including said first fixed capacitor and said first voltage source; a second voltage source for energizing said variable capacitor; an amplifier having an input circuit; a second circuit including said second source of voltage, said variable capacitor and said amplifier input circuit; a variable third source of voltage; a third circuit including said variable source of voltage, said second fixed capacitor, and said amplifier input circuit; a fourth circuit including a fourth fixed source of voltage substantially in phase with said first voltage source, said variable source of voltage, said compensating capacitor, and said amplifier input circuit; means for varying said variable voltage in a direction tending to reduce the current in the said amplifier input circuit substantially to zero in response to variations in the level of the liquid being measured, said means being controlled by said amplifier; means for connecting said apparatus to an alternating current power supply means for energizing said varying means and said voltage sources; said first, second, third and fourth circuits having a predetermined phase relation, whereby the current from said first circuit is essentially opposite in phase to the current from said second and third circuits and in phase with current induced by said fourth source of voltage and indicating means controlled by said varying means.

5. A capacitive type liquid quantity measuring apparatus comprising in combination: an amplifier provided with an input circuit, a motor under control of said amplifier, a first circuit comprising a first fixed source of voltage, a variable resistor, a fixed capacitor and said input circuit in series connection, a second circuit comprising an adjustable source of voltage substantially 180° out of phase with said first circuit voltage source, a variable capacitor unit comprising a pair of electrodes adapted to be inserted into a container of liquid so that the capacitance of the unit varies with the level of said liquid and said input circuit in series connection, a third circuit comprising a variable source of voltage substantially in phase with said second circuit voltage source and under the control of said motor, a variable resistance, a fixed capacitor and said input circuit in series connection, a fourth circuit comprising said third circuit variable voltage source, a second fixed voltage source in phase with said first circuit voltage source, a compensating capacitor having a dielectric constant substantially the same as the dielectric constant of liquid under measurement and said input circuit, and indicating means under control of said motor.

6. The apparatus of claim 5 wherein the said first circuit capacitance has in parallel a variable trimmer capacitor and said third circuit capacitor has in parallel a variable trimmer capacitor.

7. A capacitive type liquid quantity measuring apparatus comprising in combination: an amplifier provided with an input circuit, a motor under control of said amplifier, a first circuit comprising a first fixed source of voltage, a variable resistor, a fixed capacitor and said input circuit in series connection, a second circuit comprising an adjustable source of voltage substantially 180° out of phase with said first circuit voltage source, a variable capacitor unit comprising a pair of electrodes adapted to be inserted into a container of liquid so that the capacitance of the unit varies with the level of said liquid and said input circuit in series connection, a third circuit comprising a variable source of voltage substantially in phase with said second circuit voltage source and under the control of said motor, a variable resistance, a fixed capacitor and said input circuit in series connection, a fourth circuit comprising said third circuit variable voltage source, an adjustable normally fixed source of voltage in phase with said first circuit voltage source, a compensating capacitor having a dielectric constant substantially the same as the dielectric constant of liquid under measurement and said input circuit, and indicating means under control of said motor.

References Cited in the file of this patent

UNITED STATES PATENTS

| | | |
|---|---|---|
| 2,476,496 | Kliever | July 19, 1949 |
| 2,582,400 | Smith | Jan. 15, 1952 |
| 2,738,673 | Campani | Mar. 20, 1956 |
| 2,769,338 | Hermanson | Nov. 6, 1956 |

FOREIGN PATENTS

| | | |
|---|---|---|
| 693,600 | Great Britain | July 1, 1953 |
| 695,074 | Great Britain | Aug. 5, 1953 |